United States Patent
Shih et al.

(10) Patent No.: US 6,294,116 B1
(45) Date of Patent: *Sep. 25, 2001

(54) METHOD FOR PRODUCING A CROSSLINKED FORMED ARTICLE

(75) Inventors: Hsi-Hsin Shih; Chien-Tsung Wu, both of Taichung; Shihn-Juh Liou, Changhau; Yu-Chi Wang; Chang-Ming Wong, both of Hsinchu; Chi-Chou Huang; Chin-Chin Tsai, both of Taichung, all of (TW)

(73) Assignee: Industrial Technology Research Institute, Hsinchu (TW)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/172,073

(22) Filed: Oct. 14, 1998

(30) Foreign Application Priority Data

Jun. 4, 1998  (TW) .................................................. 87108901

(51) Int. Cl.$^7$ ................................................... B29C 44/20
(52) U.S. Cl. ................................................ 264/51; 264/54
(58) Field of Search ......................................... 264/54, 51

(56) References Cited

U.S. PATENT DOCUMENTS

| | | | |
|---|---|---|---|
| 3,812,225 | * 5/1974 | Hosoda et al. | 264/54 |
| 4,552,708 | * 11/1985 | Kimura et al. | 264/54 |
| 4,882,108 | * 11/1989 | Nakajima et al. | 264/54 |
| 4,960,549 | * 10/1990 | Brooks et al. | 264/54 |
| 5,043,115 | * 8/1991 | Aoshima et al. | 264/54 |
| 5,227,852 | * 7/1993 | Spydevold | 264/54 |
| 5,310,513 | * 5/1994 | Yamamoto et al. | 264/54 |
| 5,700,407 | * 12/1997 | Branger | 264/52 |

* cited by examiner

*Primary Examiner*—Allan R. Kuhns
(74) *Attorney, Agent, or Firm*—Sughrue, Mion, Zinn, Macpeak & Seas, PLLC

(57) ABSTRACT

The present invention provides a method and apparatus for producing a crosslinked foamed article. Such a method comprises the steps of: (a) uniformly mixing at least one crosslinkable resin, at least one crosslinking agent, at least one foaming agent, and some additives into a resin composition; (b) extruding the resin composition through a die into an extrudate of a predetermined shape; and (c) heating the extrudate to a temperature sufficient to cause crosslinking and foaming of the crosslinkable resin while being driven by a driving device to move in the extruding direction, thereby obtaining a crosslinked foamed article. By means of the present invention, the resin extrudate can progress smoothly through the heater or the mold.

4 Claims, 6 Drawing Sheets

METHOD FOR PRODUCING A CROSSLINKED FORMED ARTICLE

BACKGROUND OF THE INVENTION

1. Field of the Invention

The present invention relates to a method and apparatus for producing a crosslinked foamed article. During the process when the article is produced, the resin extrudate can progress through the mold smoothly.

2. Description of the Prior Art

Crosslinked foamed articles have the advantage of light weight and have been frequently used as insulating material, shoe material, cushion material, and in sporting goods. The raw materials for producing crosslinked foamed articles include thermoplastics (e.g., PE, PP, and EVA) and thermoset resins (such as rubbers). Nowadays, the production of crosslinked foamed articles can be classified into the following two methods:

(1) The polymer composition is mixed, extruded or molded to a sheet, and finally molded under pressure batchwise into a crosslinked foamed article:

(2) The polymer composition is mixed, extruded or molded to a foamed sheet, and finally subjected to batchwise crosslinking into a crosslinked foamed article.

However, the above two methods are employed in batches, thus increasing energy and production cost. Therefore, a continuous process of simultaneous crosslinking and foaming has been developed.

For example, Kimura et al. in U.S. Pat. No. 4,552,708 uses a long-land die to maintain the pressure in order to obtain a foamed article of good properties. However, in order to make the plastic materials progress smoothly through the mold, lubricant should be continuously applied to decrease friction.

Yamamoto et al. in U.S. Pat. No. 5,310,513 uses a two-zone long die. In the front zone, the plastic material is heated to cause crosslinking. In the rear zone, the crosslinked product is cooled. Finally, the crosslinked product is heated to freely expand and foam to obtain a final crosslinked foamed article. Thus, the final cross-linked foamed article having nonuniform and large bubbles is generated due to free foaming.

SUMMARY OF THE INVENTION

An object of the present invention is to solve the aforementioned problems and to provide an improved method and apparatus for producing a crosslinked foamed article. During the process when the article is produced, the resin extrudate can progress through the mold smoothly.

Another object of the present invention is to provide an improved method and apparatus for producing a crosslinked foamed article having uniform and smaller bubbles.

To achieve the above object, the method for producing a crosslinked foamed article comprises the steps of:

(a) uniformly mixing at least one crosslinkable resin, at least one crosslinking agent, at least one foaming agent, and some additives into a resin composition;

(b) extruding the resin composition through a die into an extrudate of a predetermined shape; and (c) heating the extrudate to a temperature sufficient to cause crosslinking and foaming of the crosslinkable resin while being driven by a driving device to move in the extruding direction, thereby obtaining a crosslinked foamed article.

The apparatus for producing a crosslinked foamed article of the present invention comprises:

an extruder for heating a crosslinkable resin composition into a molten resin composition, the resin composition containing at least one crosslinkable resin, at least one crosslinking agent, and at least one foaming agent;

a die, connected to the extruder, from which the molten resin composition can be extruded into a extrudate of a predetermined shape;

a heating mold for receiving and heating the extrudate to a temperature sufficient to cause crosslinking and foaming of the crosslinkable resin; and a driving means for driving the extrudate in the heating mold to move in the extruding direction.

One aspect of the present invention is that the resin extrudate can progress smoothly through the heater or mold; thus, no lubricants are required.

The second aspect of the present invention is that the resin extrudate is foamed under pressure, rather than foamed freely; therefore, bubbles generated in the final crosslinked foamed article will be uniform and smaller.

Further applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, given by way of illustration only and thus not intended to be limitative of the present invention.

DETAILED DESCRIPTION OF THE PREFERRED EMBODIMENTS

A preferred embodiment of the present invention is explained below.

A crosslinkable resin, crosslinking agents, a foaming agent and other additives are mixed and then pelletized into pellets of a crosslinkable resin composition. The formulation of the crosslinkable resin composition can be shown in the following tables. In these table, EVA represents poly(ethyl-co-vinylacetate), LDPE represents low density polyethylene, and SBR-Rubber represents styrene butadiene rubber. The foaming agent used is azodicarbonamide abbreviated to ADCA, and the crosslinking agents used are dicumyl peroxide and benzoyl peroxide, abbreviated to DCP and BPO respectively.

TABLE 1

| Ingredients | Composition 1 | Composition 2 | Composition 3 |
|---|---|---|---|
| EVA | 100 g | 100 g | 100 g |
| ADCA | 3 g | 3 g | 3 g |
| DCP | 0.15 g | 0.3 g | 0 |
| BPO | 0.15 g | 0.3 g | 0 |
| $CaCO_3$ | 30 g | 30 g | 30 g |
| ZnO | 0.3 g | 0.3 g | 0.3 g |
| ZnSt | 0.3 g | 0.3 g | 0.3 g |

TABLE 2

| Ingredients | Composition 4 | Composition 5 | Composition 6 |
|---|---|---|---|
| LDPE | 100 g | 100 g | 100 g |
| ADCA | 3 g | 3 g | 3 g |
| DCP | 0.15 g | 0.3 g | 0 |
| BPO | 0.15 g | 0.3 g | 0 |
| $CaCO_3$ | 30 g | 30 g | 30 g |
| ZnO | 0.3 g | 0.3 g | 0.3 g |
| ZnSt | 0.3 g | 0.3 g | 0.3 g |

TABLE 3

| Ingredients | Composition 7 | Composition 8 |
|---|---|---|
| SBR-Rubber | 100 g | 100 g |
| Sulfur | 2 g | 2 g |
| ADCA | 3 g | 3 g |
| $CaCO_3$ | 30 g | 30 g |
| ZnO | 0.3 g | 0.3 g |
| ZnSt | 0.3 g | 0.3 g |
| BPO | 0 | 0.1 |

Figure 1:
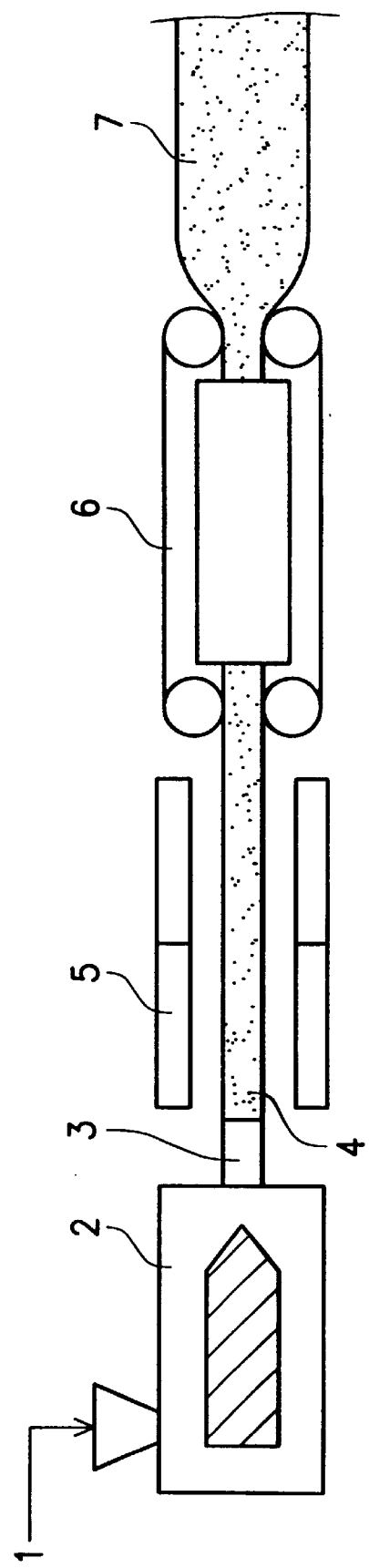
FIG. 1 shows a schematic diagram of the apparatus for producing a crosslinked foamed article according to the present invention.

Referring to FIG. 1, the pellets 1 of crosslinkable resin composition are extruded by an extruder 2 through a die 3 to form an extrudate 4 of a predetermined shape. The extrudate 4 is then passed through a heater 5 (optional) and a heating mold 6 to cause crosslinking and foaming of the crosslinkable resin, thereby obtaining a crosslinked foamed article 7.

Figure 2A:
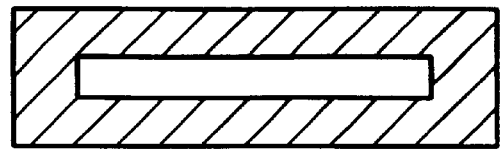
FIGS. 2A to 2C show cross-sectional views of the dies according to the embodiments of the present invention.
Figure 2B:
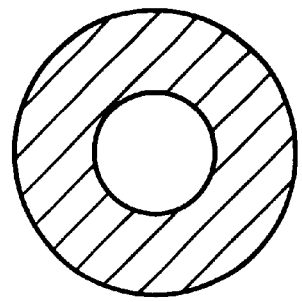
Figure 2C:
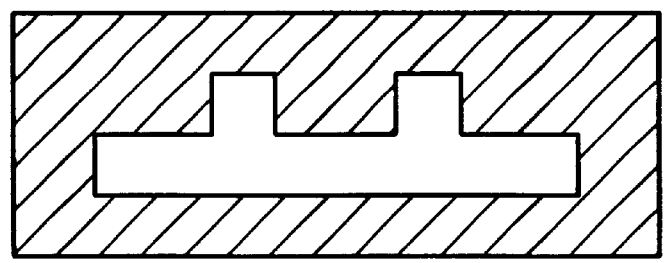

The extruder 2 is used to heat the pellets of the crosslinkable resin composition 1 into a melt and extrude said melt into an extrudate. The die 3 is used to form the extrudate into a predetermined shape. The cross-section of the die 3 can be rectangular (FIG. 2A), circular (FIG. 2B), or any shape (FIG. 2C).

Figure 3A:
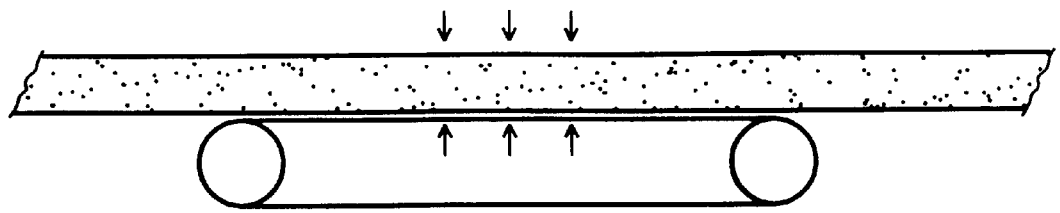
FIGS. 3A to 3C show the driving means according to the embodiments of the present invention.
Figure 3B:
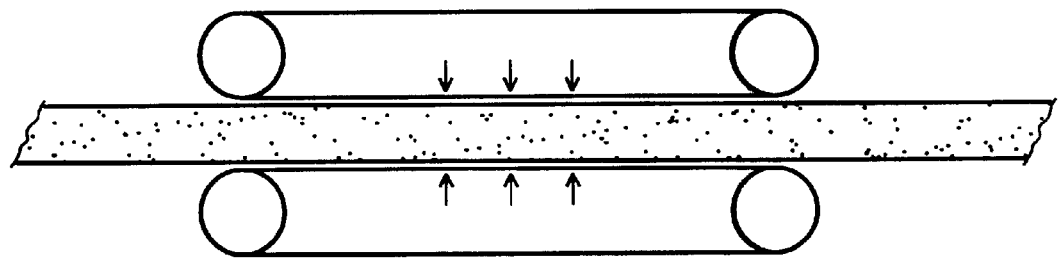

The heater 5 is used to heat the extrudate 4 to a temperature sufficient to cause partial or slight crosslinking of the crosslinkable resin. In addition, the heater 5 can also be provided with a means for driving the extrudate to move in the extruding direction. The movement can be achieved by means of a conveying belt and a pair of pulleys (FIG. 3A), wherein the conveying belt is carried on and driven by the pair of pulleys. The conveying belt contacts the extrudate, thereby driving the extrudate to move in the extruding direction. The movement in the heater 5 can also be achieved by means of two conveying belts and two pairs of pulleys (FIG. 3B), wherein each of the conveying belts is carried on and driven by each pair of pulleys. The conveying belts contact the extrudate, thereby driving the extrudate between the two conveying belts to move in the extruding direction.

Figure 3C:
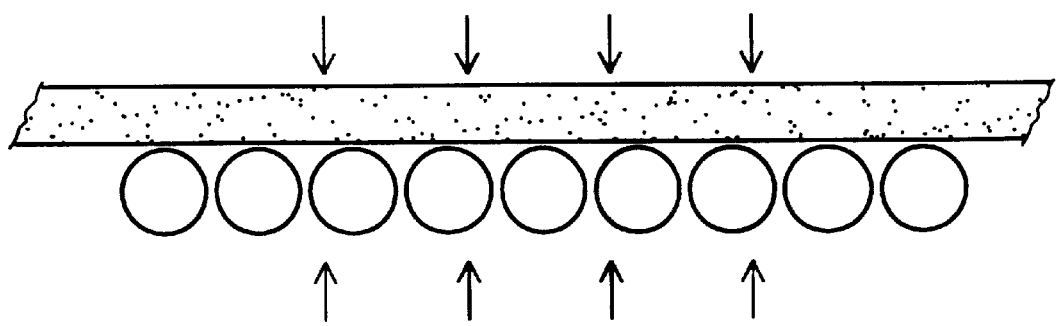

Referring to FIG. 3C, alternatively, the driving can also be achieved by means of a plurality of rollers, whereby the extrudate is moved in the extruding direction by the movement of the rollers.

Figure 4B:
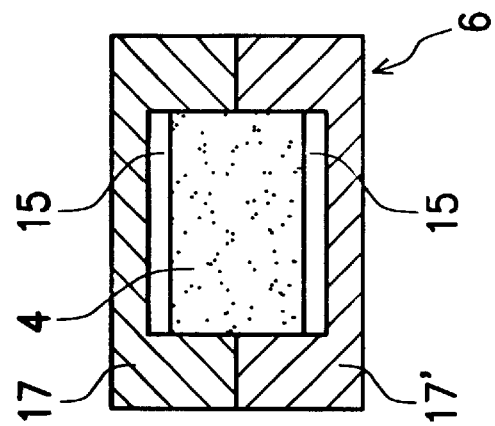
FIG. 4B is a cross-sectional view taken along line IV—IV of FIG. 4A.
Figure 4A:
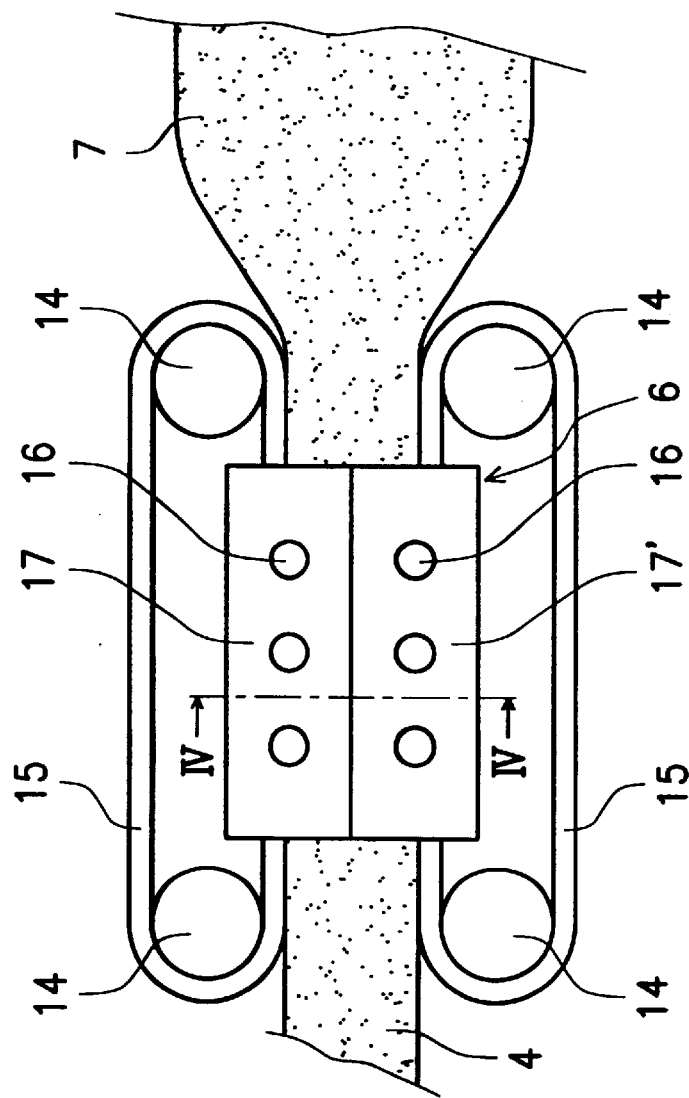
FIG. 4A shows the heating mold and driving means according to the first embodiment of the present invention.

Subsequently, the extrudate 4 enters the heating mold 6. Referring to FIGS. 4A and 4B, the heating mold 6 comprises two half molds 17 and 17', each of which has a U-shaped cross-section. Adjacent to the heating mold 6, a driving means comprising driving pulleys 14 and conveying belts 15 is provided. Each of the conveying belts 15 is carried on and driven by a pair of pulleys 14, and each of the conveying belts 15 contacts the extrudate 4, thereby driving the extrudate 4 in the heating mold 6 to move in the extruding direction. The extrudate 4 is heated in the heating mold 6 at the position indicated by 16, so as to cause crosslinking and foaming of the resin; thus the extrudate is expanded to a crosslinked foamed article 7.

Figure 5A:
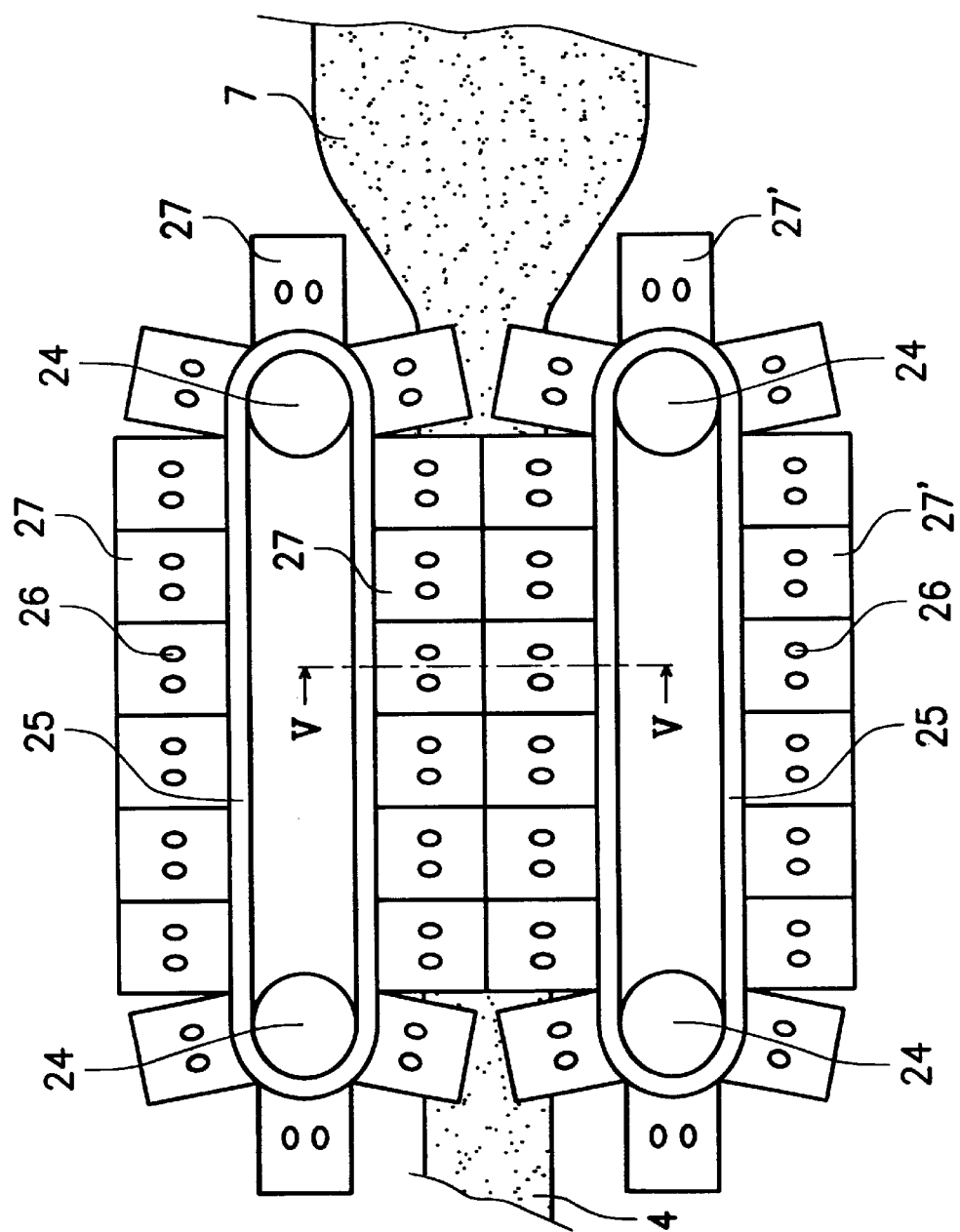
FIG. 5A shows the heating mold and driving means according to the second embodiment of the present invention.
Figure 5B:
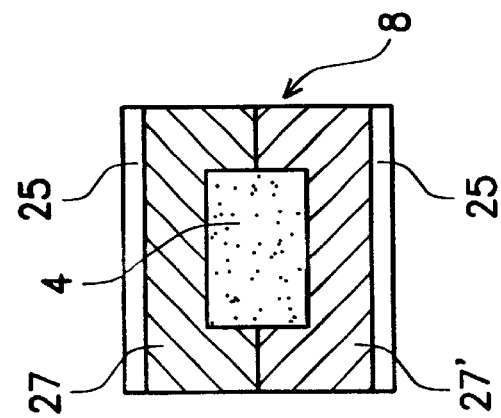
FIG. 5B is a cross-sectional view taken along line V—V of FIG. 5A.

Referring to FIGS. 5A and 5B, showing the heating mold and driving means according to the second embodiment of the present invention, a driving means comprising driving pulleys 24 and conveying belts 25 is provided. Each of the conveying belts 25 is carried on and driven by a pair of pulleys 24. The heating mold 8 is connected to and driven by the conveying belts 25, whereby the extrudate 4 is moved in the extruding direction by the movement of the heating mold 8. Each of the heating mold 8 consists of two half molds 27 and 27', each of which has a U-shaped cross-section. The extrudate 4 is heated in the heating mold 8 at the position indicated by 26, so as to cause crosslinking and foaming of the resin; thus the extrudate 4 is expanded to a crosslinked foamed article 7.

Figure 5C:
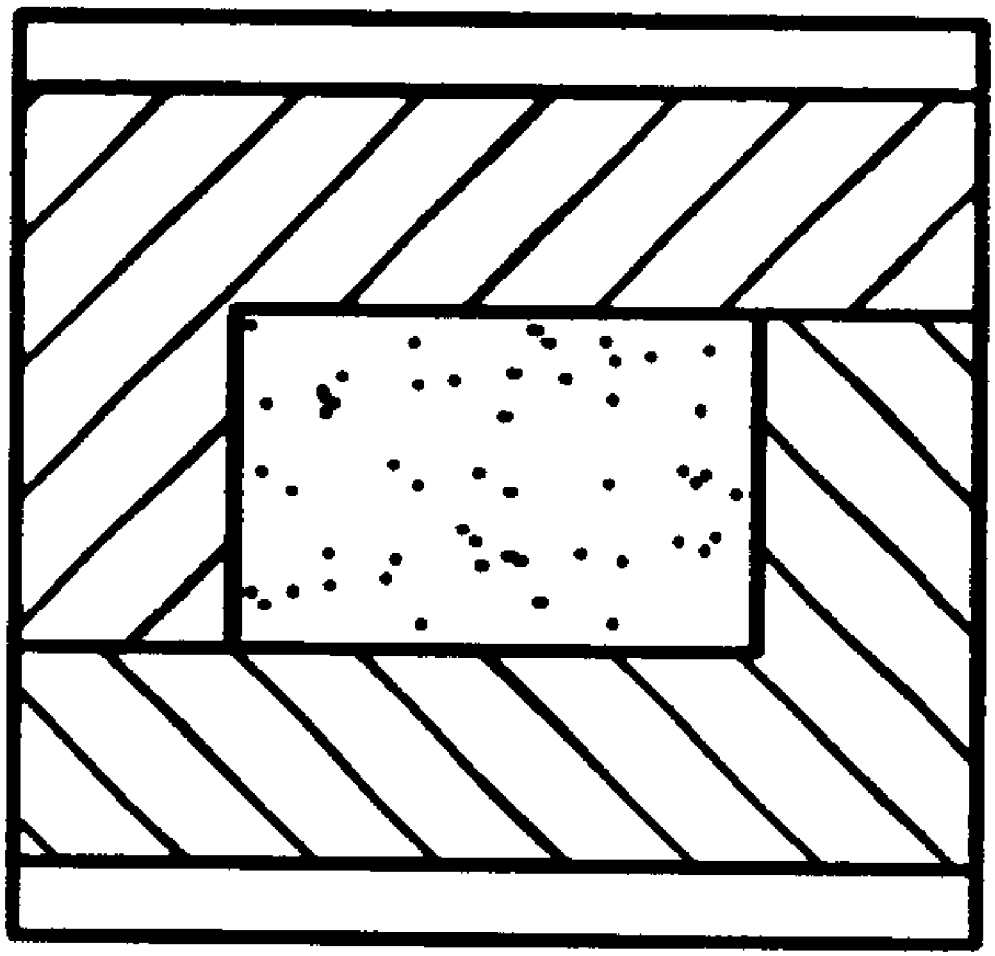
FIG. 5C is another embodiment changed from FIG. 5B.

Referring to FIG. 5C, which is another embodiment changed from FIG. SB, the heating mold consists of two half molds, each of which has an L-shaped cross-section.

In the above embodiments, the heating mold can be completely hermetic, semi-hermetic, or a combination of completely hermetic/semi-hermetic.

What is claimed is:

1. A method for producing a crosslinked foamed article, comprising the steps of:
   (a) uniformly mixing at least one crosslinkable resin, at least one crosslinking agent, at least one foaming agent , and at least one additive into a resin composition;
   (b) extruding, the resin composition through a die into an extrlidate of a predetermined shape;
   (c) passing the extrudate through to a heating mold; and
   (d) heating the extrudate in the heating mold to a temperature sufficient to cause crosslinking and foaming of the crosslinkable resin while being driven by a driving device to move in the extruding direction, thereby obtaining a crosslinked foamed article,
   wherein the crosslinkable resin is driven without the aid of a lubricant throughout the entire method.

2. The method as claimed in claim 1, further comprising step (b1), which is employed after step (b) and before step (c):
   (b1) heating the extrudate to a temperature sufficient to cause partial crosslinking of the crosslinkable resin.

3. The method as claimed in claim 2, further comprising step (b2) of driving the extrudate by a driving means to move in the extruding direction, in which steps (b1) and (b2) are employed simultaneously.

4. A method for producing a crosslinked foamed article, comprising the steps of:
   (a) uniformly mixing at least one crosslinkable resin, at least one crosslinking agent, at least one foaming agent, and at least one additive into a resin composition;

(b) extruding the resin composition through a die into an extrudate of a predetermined shape; and (c) heating the extrudate to a temperature sufficient to cause crosslinking and foaming of the crosslinkable resin while being driven by a driving device to move in the extruding direction, thereby obtaining a crosslinked foamed article, wherein the crosslinkable resin is driven without the aid of a lubricant throughout the entire method.

* * * * *